Dec. 26, 1967   J. D. SIBLEY ET AL   3,360,050
CONTROL APPARATUS FOR ROTARY WING AIRCRAFT
Filed Sept. 24, 1965   2 Sheets-Sheet 2

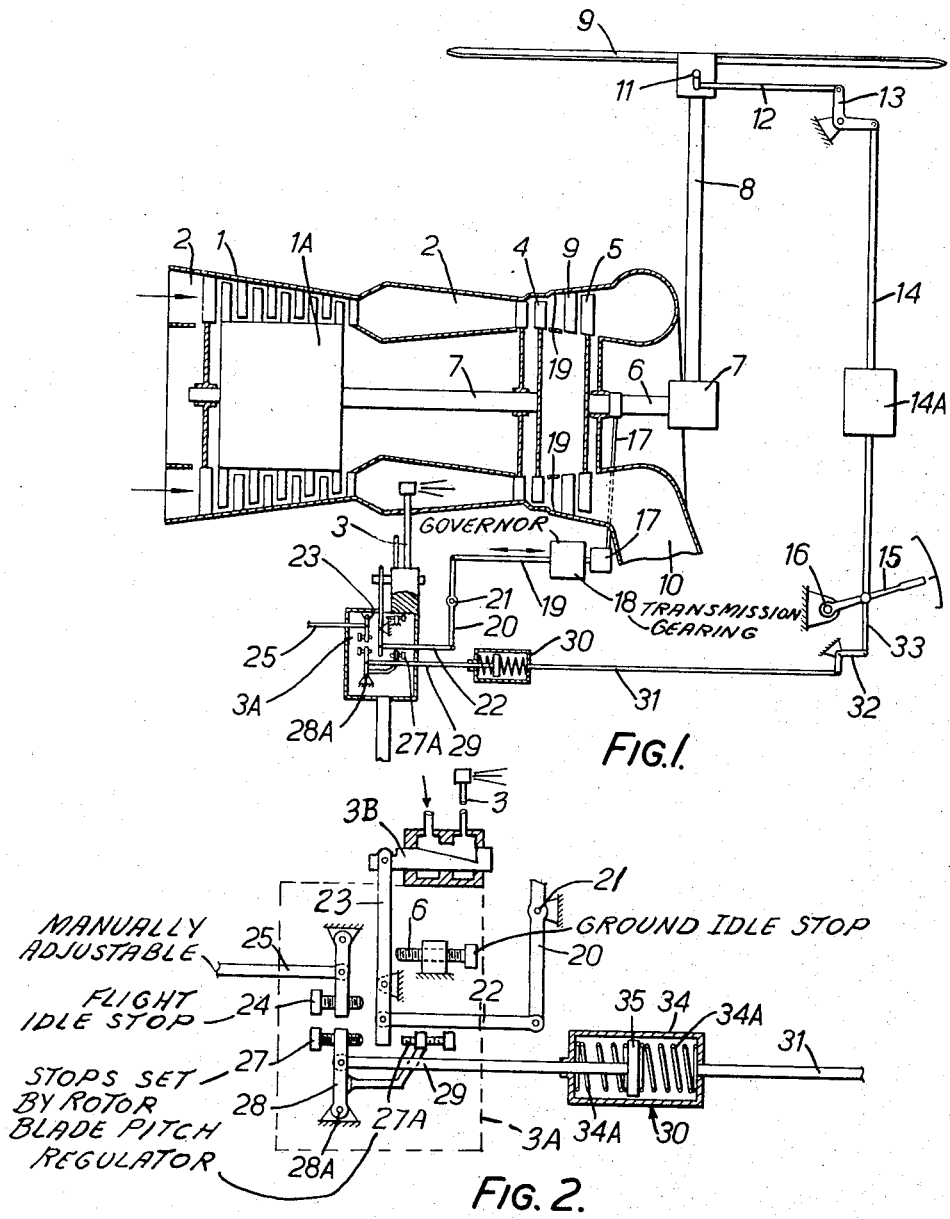

INVENTORS
J.D. SIBLEY
E.A. SIMONIS
D.L.V. LUSBY

United States Patent Office 3,360,050
Patented Dec. 26, 1967

3,360,050
CONTROL APPARATUS FOR ROTARY
WING AIRCRAFT
John D. Sibley, Watford, Edward A. Simonis, Kenton, and Desmond L. V. Lusby, Hillingdon, England, assignors to Bristol Siddeley Engines Limited, Bristol, England, a British company
Filed Sept. 24, 1965, Ser. No. 489,923
Claims priority, application Great Britain,
Sept. 24, 1964, 39,061/64
7 Claims. (Cl. 170—135.74)

ABSTRACT OF THE DISCLOSURE

The disclosure of this invention pertains to an apparatus that, while permitting the normal automatic fuel control to perform its function of maintaining the speed of the rotary wing system constant in spite of changes in the power demand resulting from the movement by the pilot of his collective pitch control lever, the automatic fuel control apparatus is prevented from reducing the fuel supply to a level which, having regard to the position of the collective pitch control lever and hence the approximate power absorption of the rotor, is undesirable or dangerous in a rotary wing aircraft.

---

The present invention relates to rotary wing aircraft of the helicopter type provided with automatic control apparatus for automatically controlling the speed of the rotary wing system and is more particularly though not exclusively concerned with safeguarding a single engined helicopter provided with such automatic control apparatus from certain failures in the automatic control apparatus which may, for example, take place when the helicopter is being used for duties which call for operation at low altitude or in close proximity to the earth's surface.

In helicopters provided with such automatic control apparatus for controlling the speed of the rotary wing system the pilot is usually provided with a collective pitch lever, a cyclic pitch lever and a rudder bar by which he can control the aircraft. In such arrangements the collective pitch lever sets the mean blade pitch of the rotary wing system and thus controls the vertical motion of the aircraft, the cyclic pitch lever imposes a cyclic variation of the pitch around the mean value of the pitch as set by the collective pitch lever, the phasing and extent of the cyclic variation controlling the direction and velocity of forward horizontal motion, and the rudder bar controls the directional orientation of the aircraft about its vertical axis in conventional manner.

The automatic control apparatus ensures that the supply of fuel to the power plant driving the rotary wing system is altered automatically to maintain a substantially constant preset rotational speed of the rotary wing system irrespective of the pilot's movements of his other controls, and this relieves the pilot of all responsibility as regards control of fuel to the engines or of controlling the speed of the rotary wing system.

It has been found that with such apparatus there is the possibility of failure to the automatic control apparatus which may result in a so called "run down," i.e. a sudden decrease of fuel below that required by the rotary wing system to maintain the preset speed, and this will result in a rapid loss of lifting force generated by the rotary wing system with corresponding rapid undesirable descent. On multi-engine aircraft the failure of the automatic fuel control system to one engine will quickly and automatically be compensated by corrective action of the automatic systems to the other engines each one of which is seeking to maintain the preset speed of the rotary wing system. On single-engined helicopters where no other power supply is available an emergency method of fuel control may be provided for such an eventuality. In the event where the single-engined helicopter is operating at low altitude sudden and almost complete loss of fuel created by a downward runaway could result in such a rapid loss of height that the aircraft would crash before the pilot had had time to be aware of the situation and revert to the alternative mode of fuel control to restore the requisite power into the rotary wing system.

The present invention has for its principal object to provide a simple protective device in these circumstances which whilst not interfering with the normal operation of the automatic control apparatus for the rotary wing system limits the effects of the forward runaway failure and by so doing gives the pilot additional time in which to detect the fault and take corrective action thus minimising the risk of a crash landing.

It can be shown for any helicopter that if the horse power demand to maintain a constant rotor speed is plotted against any other variable such as all-up-weight, ambient temperature, wind speed, forward speed, rate of vertical climb, by far the most dominant variable is mean blade angle or so called "collective pitch." If therefore curves of horse power are plotted against collective pitch angle for specific operating conditions they will all fall within a band, and corresponding bands of curves can be plotted for fuel flow and likewise for throttle angle.

It is therefore possible to set a throttle stop as a function of collective pitch angle in some relationship which will not interfere with aircraft-engine control under any normal flight operating conditions, but will limit the rundown of the fuel throttle under failure conditions to a value above that it would otherwise reach. In particular under the higher power functioning pertaining to low altitude level flight the rundown will be limited to a value substantially above that corresponding to the flight idle stop which would otherwise be reached, thus minimising the effect of the rundown, slowing down the rate of descent of the aircraft and giving the pilot more time in which to make his recovery.

Control apparatus according to the present invention for a power plant driving a rotary wing system of a helicopter type aircraft includes means for controlling the collective pitch of the rotary wing system, automatic fuel control apparatus arranged to respond automatically to change in the speed of the rotary wing system to vary the power available for the power plant in such manner as to keep such speed substantially constant, and adjustable stop means which is automatically moved with movements of the collective pitch control and is arranged to impose a variable restriction on the movement of the fuel control apparatus in a direction to reduce fuel flow. Thus the adjustable stop means is arranged to contain a downward runaway and prevent the fuel control apparatus moving more than a determined amount below the position appropriate to the power required at any given collective pitch setting.

In some cases adjustable stop means, automatically moved with movement of the collective pitch control, may also be provided to prevent upward runaway, i.e. to impose a variable restriction on movements of the fuel control apparatus in a direction to increase fuel flow.

In any case means should be provided by which whether the adjustable stop device is operative or not, the collective pitch control can be moved independently of the stop device.

The invention may be carried into practice in various ways but two constructions according to the invention will now be described by way of example with reference to the accompanying drawings, in which:

FIGURE 1 is a diagrammatic side elevation of a power plant driving a rotary wing system of a helicopter type aircraft embodying one form of control apparatus according to the invention.

FIGURE 2 is an enlarged view of part of the control apparatus shown in FIGURE 1.

Figure 3:
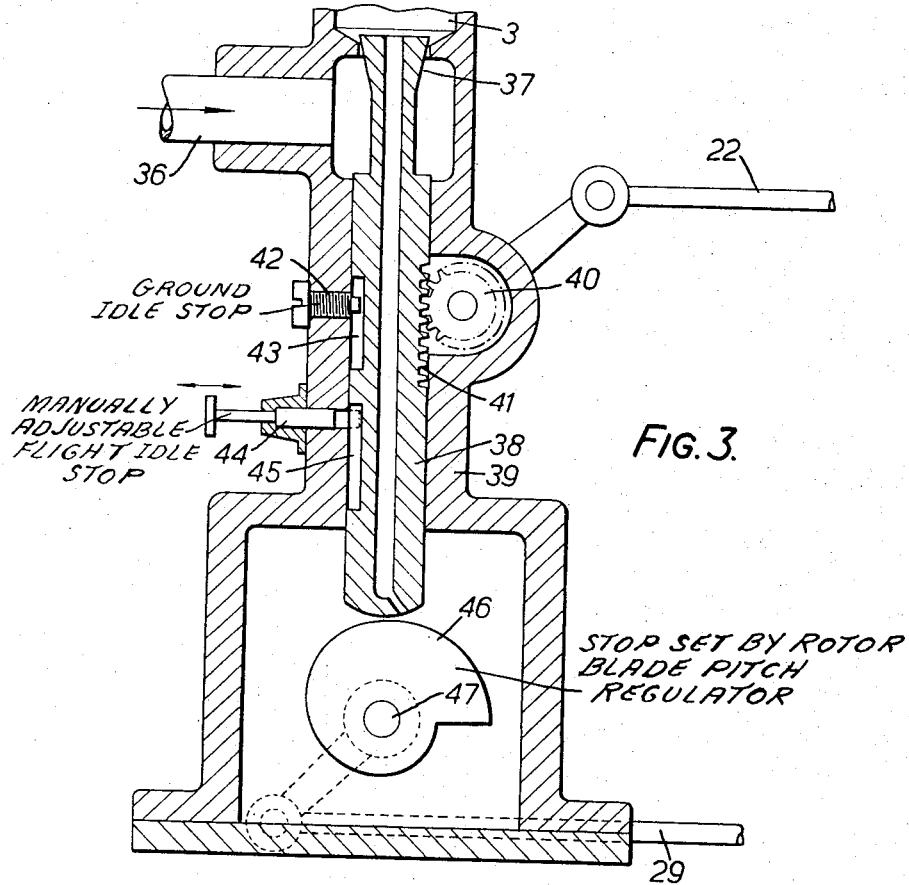
FIGURE 3 is a somewhat diagrammatic sectional side elevation showing a modified arrangement according to the invention which may be substituted for corresponding parts of the construction shown in FIGURES 1 and 2.
Figure 4:
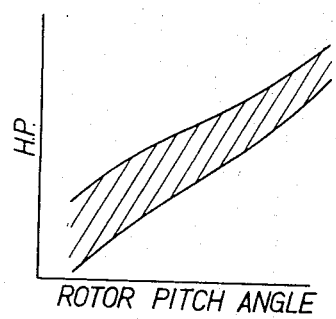
FIGURE 4 is a graph showing a typical band within which curves of horse power plotted against rotor pitch angle fall for all operating conditions.

In the construction shown in FIGURES 1 and 2 the power plant comprises a combustion turbine of known general type consisting essentially of an axial flow air compressor 1 arranged to deliver air to combustion chambers 2 in which the air is burnt with fuel delivered through a fuel delivery passage indicated at 3, the products of combustion from the combustion chambers 2 acting first on a turbine rotor 4 driving the rotor 1A of the compressor 1 and then on a second turbine rotor 5 the shaft 6 of which is connected through gearing indicated at 7 to the shaft 8 of the helicopter rotor 9, the products of combustion being exhausted to atmosphere through a passage 10. The collective pitch of the helicopter rotor 9 is controlled in known manner through a servo device and a linkage shown diagrammatically as comprising a lever 11, a link 12, a bell crank lever 13, a link 14, a servo device 14A and a manual control lever 15 operated by the pilot and thus constituting the collective pitch control lever, the lever 15, which is pivoted at 16, being moved upwardly to increase the collective pitch of the rotor and downwardly to reduce such collective pitch.

Driven from the shaft 6 of the turbine rotor 5 by transmission mechanism indicated at 17, is a fuel control governor indicated at 18 which, in a manner known per se, acts through a rod 19, a lever 20 pivoted at 21, and a link 22 on the control lever 23 which is arranged to actuate a fuel control valve 3B controlling the rate at which fuel is delivered through the fuel delivery passage 3, all in such manner as to maintain the speed of rotation of the turbine rotor 5—and hence of the helicopter rotor 9—substantially constant irrespective of changes in the collective pitch control caused by movement of the collective pitch control lever 15. Movement of the fuel control valve 3B to the left in FIGURE 2 increases the rate of fuel supply and vice versa. The arrangement as so far described is of well known type and, also as in the known type of apparatus, a stop 24 is provided—usually called the "flight idle stop"—which when the helicopter is in flight occupies the position shown and thus prevents the lever 23 from moving beyond a position corresponding to a certain minimum fuel flow corresponding to the minimum power requirement for descent while allowing for recovery. The flight idle stop 24 is capable of being removed from its operative position shown, by actuation of a rod 25 when the helicopter is not in flight and the lever 23 can then move to a lower (starting) position as determined by stop 26.

According to the form of the invention shown in FIGURES 1 and 2 there is provided, in association with the control apparatus above described, an adjustable stop 27 the position of which is determined by the position of the pilot's collective pitch control lever 15, to which end the stop 27 is mounted on the end of a lever 28 pivoted at 28A and arranged to be actuated by a rod 29 which is connected through a spring connecting device 30, a rod 31, a bell crank lever 32, and a rod 33 to the collective pitch control lever 15. A housing 3A encloses the arrangement of stops.

The spring device 30 as shown comprises a casing 34 rigid with the rod 31, a thrust member 35 rigid with the rod 29 and slidable within the casing 34 and two compression springs 34A interposed respectively between the thrust member 35 and the two ends of the casing 30.

Thus the position of the stop 27 at any moment normally depends on the position of the collective pitch control lever 15 but the spring device 30 nevertheless permit the collective pitch control lever 15 to be moved into any position within its working range irrespective of the position of the lever 23, for example should the stop 27 become immovable due to some mechanical fault or failure.

It will be understood that the movement of the lever 23 to increase the fuel delivery is that which takes place when the rod 22 moves to the right in FIGURE 1. Thus the stop 26, which is conveniently adjustable as indicated in FIGURE 2 determines the minimum fuel flow for light-up when the engine is to be started, the stop 24 then being in its inoperative position, the stop 24, when moved into its operative position by the pilot when the helicopter is to leave the ground, then controls the minimum fuel flow into the engine throughout flight unless controlled by the stop 27 which occupies at all times during flight a position determined by the position of the collective pitch control lever 15.

In a modified arrangement the lever 28 may carry an additional stop 27A similar to the stop 27 but lying on the opposite side of the lever 23 and normally spaced from it so as to limit the movement of the lever 23 in a direction to increase power to a degree dependent on the position of the collective pitch control lever 15 at any moment. The apparatus thus serves to limit movement of the fuel control to an excessive degree in either direction should the governor control fail to operate correctly.

In the modification shown in FIGURE 3 the apparatus shown is to be assumed to take the place in FIGURES 1 and 2 of the parts 3A, 23, 24, 25, 26, 27, 28 and 28A, in FIGURE 3 the fuel supply through the passage 3 from a fuel supply passage 36 is controlled by a valve 37 carried by a stem 38 arranged to slide within a casing 39 and to be moved by means of a pinion 40 engaging a rack 41 formed on the stem 38. The pinion 40 is actuated by the rod 22 in FIGURE 1 so that the rate of fuel supply is under the control of the governor 18 in a manner serving to maintain the speed of the rotor 9 during normal flight substantially constant. Moreover, in the construction diagrammatically shown in FIGURE 3 there is provided a ground idle stop indicated at 42 as a stop screw projecting into a slot 43 in the stem 38, and a flight idle stop 44 in the form of a withdrawable pin which in its operative position (i.e. during flight) projects into a slot 45 in the stem 38 as indicated in dotted lines while in its inoperative position it is withdrawn by the pilot into the position shown in full line so that the minimum fuel flow to the engine is then determined by the stop 42.

Further, in accordance with the invention there is an adjustable stop in the form of a snail cam 46 mounted upon a shaft 47 arranged to be actuated by the rod 29 in FIGURE 1, the snail cam acting as a stop for the stem 38 limiting its movement towards the closed position of the valve 37.

It will, therefore, be seen that in this construction the stop 42 determines the minimum fuel flow into the engine for light-up on the ground, the stop 44, which is rendered operative by the pilot prior to flight determines the minimum fuel flow into the engine during flight unless limited to a higher level by the stop 46 as set by the position of the collective pitch control lever 15.

Figure 5:
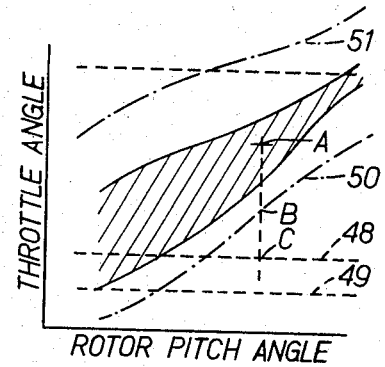
FIGURE 5 is a graph showing a corresponding band within which curves of rotor pitch angle plotted against throttle angle fall.

In FIGURE 5 the dotted line 48 represents the limit to movement of the throttle lever 23 in FIGURES 1 and 2 or of the stem 38 in FIGURE 3 imposed by the flight idle stop 24 in FIGURES 1 and 2 and by the flight idle stop 44 in FIGURE 3 while the dotted line 49 in FIGURE 5 represents the limit to such movement imposed by the light-up stop 26 in FIGURES 1 and 2 or the light-up stop 42 in FIGURE 3.

The chain dotted line 50 in FIGURE 5 represents the limit to movement of the throttle lever 23 in FIGURES 1 and 2 or of the stem 28 in FIGURE 3 imposed by the adjustable stop 27 in FIGURES 1 and 2 and the adjustable stop 46 in FIGURE 3 while the chain dotted line 51 in FIGURE 5 represents the limit to the movement of the throttle lever 23 in FIGURES 1 and 2 which would be imposed by a second stop carried by the lever 28 and disposed on and normally spaced from the opposite side of the lever 23 from the stop 27 to limit the movement of the lever 23 in the direction to increase fuel flow.

It will thus be apparent that for each setting of the collective pitch control lever 15 the stop 27 or 38 prevents the movement of the throttle lever in a direction to reduce fuel flow beyond a point which represents a fuel flow somewhat below the lower end of the range appropriate during normal operation to the setting at any moment of the collective pitch control lever but substantially removed from the point (48 in FIGURE 5), determined by the flight-idle stop 23 or 44, to which it could move in the absence of the stop 27 or 38. For example suppose the throttle lever to occupy the position A in FIGURE 5 and a downward run-away to occur the movement of the throttle lever 23 or the valve 37 to reduce fuel flow will be stopped at the point B instead of continuing to the point C, at which sufficiently rapid recovery in emergency might be impossible.

What we claim as our invention and desire to secure by Letters Patent is:

1. A power plant for aircraft of the helicopter type comprising, a power unit, a rotary wing system driven by the power unit, collective pitch control means controlling the collective pitch of the rotary wing system, automatic fuel control apparatus for the power unit arranged to respond automatically to changes in the power demands of the rotary wing system to vary the power available from the power plant in accordance with changes in such demands, and adjustable stop means which is automatically moved with movements of the collective pitch control and imposes a variable restriction on the range of movement of the fuel control apparatus in a manner such that at any setting of the collective pitch control means it will prevent the fuel control apparatus from moving in at least one direction more than a predetermined amount from the position appropriate to the power required at that setting.

2. A power plant driving a rotary wing system of a helicopter as claimed in claim 1 in which the adjustable stop means includes a stop arranged to limit the movement of the fuel control apparatus in a direction to reduce the fuel supply.

3. A power plant driving a rotary wing system of a helicopter type aircraft as claimed in claim 2 in which the adjustable stop means includes a stop arranged to control the movement of the fuel control apparatus in a direction to increase the fuel supply.

4. A power plant driving a rotary wing system of a helicopter type aircraft as claimed in claim 1 including a "flight idle" stop which is independent of the adjustable stop means and operating mechanism for the flight idle stop by which it can be moved into an operative position in which it limits the movement of the fuel control apparatus in a direction to reduce the fuel supply to an amount appropriate to the minimum power required when the aircraft is in flight, and an inoperative position in which it permits a further reduction in the fuel supply to a point which is determined by a "ground idle" stop and is suitable for the minimum rotor speed when the aircraft is on the ground.

5. A power plant for aircraft of the helicopter type as claimed in claim 2 including spring connecting means between the collective pitch control means and the adjustable stop, said spring connecting means being capable of yielding to permit movement of the collective pitch control independently of the adjustable stop should movement of the adjustable stop be prevented.

6. A power plant for aircraft of the helicopter type as claimed in claim 1 including spring connecting means between the collective pitch control means and the adjustable stop, said spring connecting means being capable of yielding to permit movement of the cellective pitch control independently of the adjustable stop should movement of the adjustable stop be prevented.

7. A power plant for aircraft of the helicopter type comprising, a power unit, a rotary wing system driven by the power unit, collective pitch control means controlling the collective pitch of the rotary wing system, automatic fuel control apparatus for the power unit automatically responsive to changes in the power demands of the rotary wing system to vary the power available from the power plant in accordance with changes in such demands, and adjustable stop means which is automatically moved with movements of the collective pitch control and imposes a variable restriction on the range of movement of the fuel control apparatus in a manner such that at any setting of the collective pitch control means, it will prevent the fuel control apparatus from moving in at least one direction more than a predetermined amount from the position appropriate to the power required at that setting.

References Cited
UNITED STATES PATENTS 2,664,958  1/1954  Dancik _____ 170—135.74
3,108,435  10/1963  Chandler et al. ____ 60—39.28 X JULIUS E. WEST, *Primary Examiner.*